United States Patent
Chen (10) Patent No.: US 11,425,556 B2
(45) Date of Patent: Aug. 23, 2022

(54) METHOD FOR REPORTING USER EQUIPMENT CAPABILITY, METHOD FOR RESOURCE SCHEDULING, USER EQUIPMENT AND NETWORK DEVICE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/961,917

(22) PCT Filed: Jan. 10, 2019

(86) PCT No.: PCT/CN2019/071143
§ 371 (c)(1),
(2) Date: Jul. 13, 2020

(87) PCT Pub. No.: WO2019/137427
PCT Pub. Date: Jul. 18, 2019

(65) Prior Publication Data
US 2020/0344595 A1    Oct. 29, 2020

(30) Foreign Application Priority Data

Jan. 12, 2018 (CN) .......................... 201810032649.X (51) Int. Cl.
*H04W 8/24* (2009.01)
*H04W 76/27* (2018.01)
(Continued)

(52) U.S. Cl.
CPC .............. *H04W 8/24* (2013.01); *H04W 4/12* (2013.01); *H04W 72/042* (2013.01);
(Continued)

(58) Field of Classification Search
CPC . H04W 8/24; H04W 72/0453; H04W 72/046; H04W 80/02; H04W 72/042; H04W 76/27; H04W 4/12
(Continued)

(56) References Cited

U.S. PATENT DOCUMENTS

2014/0211740 A1* 7/2014 Berggren ............... H04L 5/0007
370/329
2014/0233379 A1* 8/2014 Chu .................. H04W 28/0289
370/230
(Continued)

FOREIGN PATENT DOCUMENTS

| CN | 102740485 A | 10/2012 |
|----|----|----|
| CN | 103260242 A | 8/2013 |
| WO | 2016/204676 A1 | 12/2016 |

OTHER PUBLICATIONS

"Report of email discussion [NR-AH1#14] [NR] UE capability" 3GPP TSG-RAN WG2 NR Adhoc, Feb. 13, 2017.
(Continued)

*Primary Examiner* — Congvan Tran
(74) *Attorney, Agent, or Firm* — Maschoff Brennan (57) ABSTRACT

A method for reporting a user equipment capability is provided, which is performed by a user equipment. The method includes: determining whether a user equipment capability needs to be reported, where the user equipment capability is associated with a frequency-domain position and/or a spatial domain position; and reporting, in a case that it is determined that the user equipment capability needs to be reported, the user equipment capability to a network device. A corresponding method for resource scheduling performed by a network device, a corresponding user equipment and a corresponding network device are also provided.

20 Claims, 2 Drawing Sheets

(51) Int. Cl.
*H04W 4/12* (2009.01)
*H04W 72/04* (2009.01)
*H04W 80/02* (2009.01)

(52) U.S. Cl.
CPC ..... *H04W 72/046* (2013.01); *H04W 72/0453* (2013.01); *H04W 76/27* (2018.02); *H04W 80/02* (2013.01)

(58) Field of Classification Search
USPC .................................................. 370/329–329
See application file for complete search history.

(56) References Cited

U.S. PATENT DOCUMENTS

| | | | |
|---|---|---|---|
| 2016/0212752 A1* | 7/2016 | Xu | H04L 5/0053 |
| 2018/0091994 A1* | 3/2018 | Ozturk | H04L 5/001 |
| 2018/0220295 A1* | 8/2018 | Takahashi | H04W 8/24 |
| 2019/0305918 A1* | 10/2019 | Siomina | H04W 76/36 |

OTHER PUBLICATIONS

Written Opinion and International Search Report in Application No. PCT/CN2019/071143 dated Jul. 23, 2020.

Intel Corporation, Remaining Details for Bandwidth Parts, 3GPP TSG RAN WG1 Meeting 91, R1-1720100, Reno, USA, Nov. 27-Dec. 1, 2017.

Nokia, Nokia Shanghai Bell, Summary of QCL, 3GPP TSG RAN WG1 Meeting #91, R1-1721429, Reno, Nevada, USA, Nov. 27-Dec. 1, 2017.

Mediatek Inc., Summary of Bandwidth Part Operation, 3GPP TSG RAN WG1 Meeting 91, R1-1721504, Reno, USA, Nov. 27-Dec. 1, 2017.

Extended European Search Report issued in corresponding application No. 19738316.9, dated Feb. 3, 2021.

\* cited by examiner

METHOD FOR REPORTING USER EQUIPMENT CAPABILITY, METHOD FOR RESOURCE SCHEDULING, USER EQUIPMENT AND NETWORK DEVICE

CROSS-REFERENCE TO RELATED APPLICATION

This application is the U.S. national phase of PCT Application No. PCT/CN2019/071143 filed on Jan. 10, 2019, which claims a priority to Chinese Patent Application No. 201810032649.X filed on Jan. 12, 2018, the disclosures of which are incorporated in their entirety by reference herein.

TECHNICAL FIELD

The present disclosure relates to the field of communication, and in particular to a method for reporting a user equipment capability, a method for resource scheduling, a corresponding user equipment, and a corresponding network device.

BACKGROUND

With the development of mobile communication technology, the 5th generation (5th Generation, 5G) mobile communication system is approaching. To support greater system and user throughput, the 5G system supports division in frequency domain and space, so that user equipment can receive and transmit signals at different frequency-domain positions and/or spatial domain positions.

For example, the 5G system supports a maximum system bandwidth of 400 MHz, which is much larger than a maximum system bandwidth of 20 MHz of long term evolution (LTE), thus supporting greater system and user throughput. Moreover, the 5G system also supports dynamic and flexible bandwidth allocation. The system bandwidth can be divided into multiple bandwidth parts (BWP) to support a narrowband terminal user or a terminal user in energy-saving mode, so that it only needs to operate on a part of the system bandwidth.

As another example, the 5G system also supports an operating frequency band above 6 GHz, which can provide greater throughput for data transmission. Due to a short wavelength of a high-frequency signal, as compared with a low-frequency-band signal, it is possible to arrange more antenna elements on a panel with a same size, and multiple beams which are more directional and have narrower lobes are formed by using beamforming technology. The 5G system can use beam scanning technology to send a broadcast signal or system information to a terminal user in a cell.

Since a user equipment may have different performance requirements in different frequency-domain positions and/or spatial domain positions, its actual capability may also vary with the frequency-domain position and/or the spatial domain position. Therefore, a method for dynamically reporting user equipment capabilities for different frequency-domain positions and/or spatial domain positions is needed, to improve utilization of system resource.

SUMMARY

Embodiments of the present disclosure provide a method for reporting a user equipment capability, a method for resource scheduling, a corresponding user equipment, and a corresponding network device, so the a user equipment can dynamically report user equipment capabilities for different frequency-domain positions and/or spatial domain positions so as to improve utilization of system resource.

In a first aspect, embodiments of the present disclosure provide a method for reporting a user equipment capability, performed by a user equipment, including:

determining whether a user equipment capability needs to be reported, wherein the user equipment capability is associated with a frequency-domain position and/or a spatial domain position; and reporting, in a case that it is determined that the user equipment capability needs to be reported, the user equipment capability to a network device.

In a second aspect, embodiments of the present disclosure provide a method for resource scheduling, performed by a network device, including:

receiving a user equipment capability sent by a user equipment, wherein the user equipment capability is associated with a frequency-domain position and/or a spatial domain position; and scheduling a resource of the user equipment in the frequency-domain position and/or the spatial domain position according to the user equipment capability.

In a third aspect, embodiments of the present disclosure provide a user equipment, including:

a report determining module, configured to determine whether a user equipment capability needs to be reported, wherein the user equipment capability is associated with a frequency-domain position and/or a spatial domain position; and a capability reporting module, configured to report the user equipment capability to a network device in a case that it is determined that the user equipment capability needs to be reported.

In a fourth aspect, embodiments of the present disclosure provide a network device, including:

a capability receiving module, configured to receive a user equipment capability sent by a user equipment, wherein the user equipment capability is associated with a frequency-domain position and/or a spatial domain position; and a scheduling module, configured to schedule a resource of the user equipment in the frequency-domain position and/or the spatial domain position according to the user equipment capability.

In a fifth aspect, embodiments of the present disclosure provide a user equipment, including: a memory, a processor, and a program stored on the memory and executable by the processor, wherein, when the program is executed by the processor, steps of the method in the first aspect are implemented.

In a sixth aspect, embodiments of the present disclosure provide a network device, including: a memory, a processor, and a program stored on the memory and executable by the processor, wherein, when the program is executed by the processor, steps of the method in the second aspect are implemented.

In a seventh aspect, embodiments of the present disclosure provide a computer readable storage medium, having a program stored thereon, wherein, when the program is executed by a processor, steps of the method in the first aspect or the second aspect are implemented.

In the embodiments of the present disclosure, the capability associated with the frequency-domain position and/or the spatial domain position is reported by the user equipment to the network device. In this way, the network device can schedule resource occupation of the user equipment in the corresponding frequency-domain position and/or spatial domain position according to the capability reported by the user equipment, which achieves flexible scheduling of system resource and improves utilization of system resource.

BRIEF DESCRIPTION OF THE DRAWINGS

The drawings described herein are used to provide further understanding of the present disclosure and form a part of the present disclosure. The exemplary embodiments of the present disclosure and descriptions thereof are used to explain the present disclosure and do not constitute an undue limitation to the present disclosure. In the drawings.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

The technical solutions of the present disclosure may be applied to a variety of communication systems with multiple frequency-domain positions or spatial domain positions, such as fifth-generation (5-Generation, 5G) mobile communication system, LTE connected to 5G core network (5GC), eLTE (E-UTRA connect to 5GC), etc.

User equipment (UE), also known as mobile terminal, mobile user equipment, etc., may communicate with one or more core networks via a radio access network (RAN). The user equipment may be, for example, a mobile phone (or referred to as cellular phone) and may be a computer with a user equipment, such as a portable, pocket-sized, handheld, computer-built-in or vehicle-mounted mobile device, which exchanges language and/or data with a radio access network.

Base station (network device) may be a base station (Base Transceiver Station, BTS) in Global System for Mobile Communications (GSM) or Code-Division Multiple Access (CDMA), or may be a base station (NodeB) in Wideband Code Division Multiple Access (WCDMA), or may be an evolutional base station (evolutional Node B, eNB or e-NodeB) in LTE and a 5G base station (gNB), which is not limited in the present disclosure. For convenience of description, the following embodiments use gNB as an example of a network device.

The technical solutions provided by the embodiments of the present disclosure will be described in detail hereinafter in conjunction with the drawings.

First Embodiment

Figure 1:
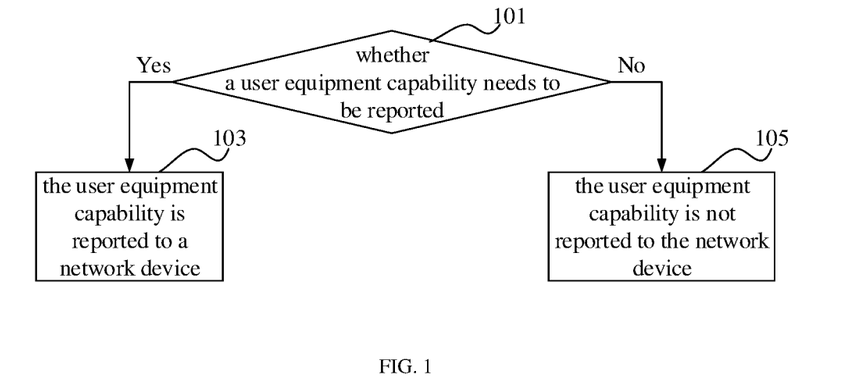
FIG. 1 is a schematic flowchart of a method for reporting a user equipment capability provided by embodiments of the present disclosure.

As shown in FIG. 1, embodiments of the present disclosure provide a method for reporting a user equipment capability, which is performed by a user equipment. The method includes the following steps.

Step 101 includes: determining whether a user equipment capability needs to be reported, wherein the user equipment capability is associated with a frequency-domain position and/or a spatial domain position.

Step 103 includes: reporting, in a case that it is determined that the user equipment capability needs to be reported, the user equipment capability to a network device.

It can be understood that, after the determination in step 101, when it is determined that the user equipment capability is not required to be reported, step 105 may be performed without reporting the user equipment capability to the network device, as shown in FIG. 1.

In order to more flexibly receive and send signals, in the 5G system, frequency domain and/or spatial domain may be divided. For example, the system bandwidth may be divided into multiple parts to form multiple bandwidth parts (BWP), thereby forming a communication system in which multiple frequency-domain positions exist. As another example, multiple beams with stronger directivity and narrower lobes may be formed by using beamforming technology, thereby forming a communication system in which multiple spatial domain positions exist.

It can be understood that the way of dividing the frequency domain is not limited to the way of dividing the system bandwidth into the bandwidth parts (BWP) in the above example, and also may be dividing the frequency band, carrier or component carrier of the system to form multiple frequency-domain positions. Depending on how the frequency domain is divided, the frequency-domain position may correspond to any of the following: a bandwidth part (BWP) identifier, a user equipment (UE) identifier, a band identifier, a band combination identifier, a component carrier identifier, or, a carrier identifier. For different frequency-domain positions, user equipment capabilities of the user equipment (UE) at the various frequency-domain positions may be different.

Using the method provided by the embodiments of the present disclosure, the user equipment may upload the user equipment capability associated with the frequency-domain position to the network device. Specifically, depending on the division of the frequency domain, the reported user equipment capability may be a capability in a certain bandwidth part (per-BWP capability), or may be a capability in a certain band (per-band capability), or may be a capability in a certain band combination (per-band combination capability), or may be a capability in a certain component carrier (per-component carrier capability), or may be a capability in a certain carrier (per-carrier capability), or may be a capability of a certain user equipment (per-UE capability). This per-UE capability may be understood as a unified set of capabilities for any system configuration of the user equipment. The definitions of the above-mentioned capabilities correspond to different granularities, and the per-UE capability has the coarsest granularity, which may be understood as a general capability of user equipment.

It can also be understood that the manner of dividing the spatial domain is not limited to the manner of forming multiple beams in the above example, and the carrier, transmission point, or quasi-co-location may be divided to form multiple spatial domain positions. Depending on how the spatial domain is divided, the spatial domain position may correspond to any of the following: a beam identifier, a carrier identifier, a transmission point identifier, and a quasi-co-location (QCL) identifier.

It can also be understood that the communication system may only divide the frequency domain to form multiple frequency-domain positions; it may only divide the spatial domain to form multiple spatial domain positions; it may divide both the frequency domain and the spatial domain, thereby forming multiple frequency-domain positions in the frequency domain and forming multiple spatial domain positions in the spatial domain.

In a communication system where there are multiple frequency-domain positions and/or spatial domain positions, a user equipment may have different performance requirements in different frequency-domain positions and/or spatial domain positions, and its actual capability may vary with the frequency-domain position and/or the spatial domain position. In the embodiments of the present disclosure, the user equipment capability reported by the user equipment to the network device is associated with the frequency-domain position and/or the spatial domain position, hence, the network device can perform resource scheduling according to the capability reported by the user equipment, and the user equipment can receive and send signals according to the resource scheduled by the network device according to the user equipment capability. In this way, flexible scheduling of system resource can be achieved and utilization of system resource can be improved.

Further, in the embodiments of the present disclosure, in the user equipment determining whether to report the user equipment capability to the network device and in reporting the user equipment capability to the network device, timing of the reporting, content of the reporting, form of the reporting, etc., may be determined according to agreements in technical specification, needs of the user equipment, or requirements of the network device, etc. Descriptions are provided hereinafter in detail with examples.

It should be noted that, in the embodiments of the present disclosure, the reported user equipment capability is associated with the frequency-domain position and/or the spatial domain position, and this association relationship may take different forms. Specifically, the frequency-domain position and/or the spatial domain position associated with the user equipment capability reported to the network device may be any of the following cases:

a frequency-domain position and/or a spatial domain position specifically configured by the network device for the user equipment;

a frequency-domain position and/or a spatial domain position that the user equipment has accessed (equivalent to being activated);

a frequency-domain position and/or a spatial domain position that the network device indicates the user equipment to access (equivalent to being about to be activated);

a frequency-domain position and/or a spatial domain position accessed after handover is performed by the network device on the user equipment;

a frequency-domain position and/or a spatial domain position configured by default when the network device performs overall configuration on the user equipment;

a frequency-domain position and/or a spatial domain position activated by default when the network device performs overall activation on the user equipment;

a frequency-domain position and/or a spatial domain position initially configured for the user equipment according to agreement in technical specification;

a frequency-domain position and/or a spatial domain position initially activated for the user equipment according to agreement in technical specification;

all frequency-domain positions and/or spatial domain positions allowed to be configured for the user equipment; or, all frequency-domain positions and/or spatial domain positions that can be supported by the user equipment.

It can be understood that specific contents of the user equipment capabilities associated with frequency-domain positions and/or spatial domain positions in different ranges may be different. In an implementation, the capability of the user equipment reported to the network device includes a capability of the user equipment in a certain frequency-domain position and/or a certain spatial domain position associated with the user equipment.

In performing the determining whether the user equipment capability needs to be reported in step 101, there are multiple implementations, and various aspects can be examined, which are illustrated with examples hereinafter.

In a first implementation, in performing the determining whether the user equipment capability needs to be reported in step 101, it may be directly determined that the user equipment capability needs to be reported in a case that the user equipment initially accesses a network. For this implementation, when the user equipment determines that the capability of the user equipment needs to be reported, usually, a message sent by the network device which is associated with configuration, activation, or handover of the frequency-domain position and/or the spatial domain position is not received. Therefore, the user equipment needs to determine what kind of user equipment capability is to be reported to the network device, based on initial information agreed in technical specification or related information inherent in the user equipment (such as hardware configuration of the user equipment, etc.). In other words, it is needed to determine which frequency-domain positions and/or spatial domain positions that are associated with the user equipment capability are reported. For example, when step 103 is performed, the user equipment capability may be reported to the network device in any of the following ways:

reporting the user equipment capability to the network device according to a frequency-domain position and/or a spatial domain position allowed to be configured for the user equipment, where the user equipment capability is associated with the frequency-domain position and/or the spatial domain position that are allowed to be configured;

reporting the user equipment capability to the network device according to a frequency-domain position and/or a spatial domain position capable of being supported by the user equipment, where the user equipment capability is associated with the frequency-domain position and/or the spatial domain position that are capable of being supported;

reporting the user equipment capability to the network device according to an initial configuration information of the user equipment, where the user equipment capability is associated with a frequency-domain position and/or a spatial domain position corresponding to the initial configuration information; or, reporting the user equipment capability to the network device according to an initial activation information of the user equipment, where the user equipment capability is associated with a frequency-domain position and/or a spatial domain position corresponding to the initial activation information.

It should be noted that the frequency-domain position and/or spatial domain position allowed to be configured for the user equipment may be determined according to hardware implementation of the user equipment and system configuration delivered by the network device. The frequency-domain position and/or spatial domain position that the user equipment can support may be determined according to the own hardware implementation of the user and the system configuration delivered by the network device. The initial configuration information of the user equipment and the initial activation information of the user equipment are determined according to a communication protocol between the user equipment and the network device.

In a second implementation, when the user equipment initially accesses the network, or at any stage in usage of the user equipment, whether to report the user equipment capability may be determined according to whether a message sent by the network device is received. Specifically, in a case that the message sent by the network device is received, it may be determined that the capability of the user equipment needs to be reported. Correspondingly, in a case that the message sent by the network device is not received, it may be determined that the user equipment capability does not need to be reported, and then step 105 is performed to not report the user equipment capability to the network device.

More specifically, the message sent by the network device may be one or more of: a default configuration message, a configuration message, a default activation message, an activation message, a frequency-domain switching message, or, a spatial domain switching message. Therefore, the determining that the capability of the user equipment needs to be reported in a case that the message sent by the network device is received, may specifically include any of the following:

in a case that the default configuration message sent by the network device is received, it is determined that the capability information of the user equipment needs to be reported, where the default configuration message is used to configure the user equipment with a parameter including a frequency-domain position and/or a spatial domain position;

in a case that the configuration message sent by the network device is received, it is determined that the capability information of the user equipment needs to be reported, where the configuration message is used to configure a frequency-domain position and/or a spatial domain position for the user equipment;

in a case that the default activation message sent by the network device is received, it is determined that the capability information of the user equipment needs to be reported, where the default activation message is used to set, for the user equipment, a frequency-domain position and/or a spatial domain position that are activated by default;

in a case that the activation message sent by the network device is received, it is determined that the capability information of the user equipment needs to be reported, where the activation message is used to activate a frequency-domain position and/or a spatial domain position for the user equipment; or, in a case that the frequency-domain switching message and/or spatial domain switching message sent by the network device are received, it is determined that the capability information of the user equipment needs to be reported, where the frequency-domain switching message is used to indicate the user equipment to switch to a target frequency-domain position, and the spatial domain switching message is used to indicate the user equipment to switch to a target spatial domain position.

In a third implementation, based on the second implementation described above where whether to report the user equipment capability is determined according to whether the message sent by the network device is received, it may be further determined whether the received message (which may be one or more of: the default configuration message, the configuration message, the default activation message, the activation message, the frequency-domain switching message, or the spatial domain switching message) causes the frequency-domain position and/or spatial domain position corresponding to the user equipment to change. Specifically, when the message sent by the network device is received, and the frequency-domain position and/or the spatial domain position corresponding to the user equipment do not change according to the message, it may be determined that there is no need to report the user equipment capability, and then step 105 is performed to not to report the user equipment capability to the network device.

When the message sent by the network device is received, and the frequency-domain position and/or the spatial domain position corresponding to the user equipment change according to the message, it is determined that the user equipment capability needs to be reported. Corresponding to different types of messages, it may specifically include any of the following:

determining that the capability information of the user equipment needs to be reported, in a case that the default configuration message sent by the network device is received, and a frequency-domain position and/or a spatial domain position corresponding to the user equipment change according to the default configuration message;

determining that the capability information of the user equipment needs to be reported, in a case that the configuration message sent by the network device is received, and a frequency-domain position and/or a spatial domain position corresponding to the user equipment change according to the configuration message;

determining that the capability information of the user equipment needs to be reported, in a case that the default activation message sent by the network device is received, and a frequency-domain position and/or a spatial domain position corresponding to the user equipment change according to the default activation message;

determining that the capability information of the user equipment needs to be reported, in a case that the activation message sent by the network device is received, and a frequency-domain position and/or a spatial domain position corresponding to the user equipment change according to the activation message;

determining that the capability information of the user equipment needs to be reported, in a case that the frequency-domain switching message sent by the network device is received, and a frequency-domain position and/or a spatial domain position corresponding to the user equipment change according to the frequency-domain switching message; or, determining that the capability information of the user equipment needs to be reported, in a case that the spatial domain switching message sent by the network device is received, and a frequency-domain position and/or a spatial domain position corresponding to the user equipment change according to the spatial domain switching message.

In a fourth implementation, based on the third implementation manner described above where whether the capability of the user equipment is reported is determined according to whether a message sent by the network device is received and whether the received message causes change in the frequency-domain position and/or the spatial domain position corresponding to the user equipment, it may be further investigated whether the changed frequency-domain position and/or the changed spatial domain position are a frequency-domain position and/or a spatial domain position that the user equipment can support. Specifically, it may be determined that the user equipment capability does not need to be reported and it may be determined that the user equipment ignores the message sent by the network device, in a case that the message sent by the network device is received, the frequency-domain position and/or the spatial domain position corresponding to the user equipment change according to the message, and the changed frequency-domain position and/or the changed spatial domain position are not a frequency-domain position and/or a spatial domain position capable of being supported by the user equipment. Then step 105 is performed to not report the user equipment capability to the network device, and the frequency-domain position and/or the spatial domain position may not be changed according to the received message.

It may be determined that the user equipment capability needs to be reported, in a case that a message sent by the network device is received, a frequency-domain position and/or a spatial domain position corresponding to the user equipment change according to the message, and the changed frequency-domain position and/or the changed spatial domain position are a frequency-domain position and/or a spatial domain position capable of being supported by the user equipment.

Similarly, the message sent by the network device received by the user equipment may include at least one of the following:

a default configuration message, used to configure the user equipment with a parameter including a frequency-domain position and/or a spatial domain position;

a configuration message, used to configure a frequency-domain position and/or a spatial domain position for the user equipment;

a default activation message, used to set, for the user equipment, a frequency-domain position and/or a spatial domain position that are activated by default;

an activation message, used to activate a frequency-domain position and/or a spatial domain position for the user equipment;

a frequency-domain switching message, used to indicate the user equipment to switch to a target frequency-domain position; or, a spatial domain switching message, used to indicate the user equipment to switch to a target spatial domain position.

Specifically, the message sent by the network device may be sent by the network device in at least one of the following ways: a radio resource control (RRC) message, a media access control (MAC) control element, or, downlink control indication (DCI) corresponding to a downlink control channel.

In a fifth implementation, in determining whether the user equipment capability needs to be reported, determination may also be made in conjunction with the performed behavior of the user equipment of reporting the user equipment capability, on the basis of the above various implementations. Specifically, it may be determined that the user equipment capability does not need to be reported or it may be determined that a capability part included in a first user equipment capability does not need to be reported, after the first user equipment capability is reported to the network device by the user equipment and before a preset time expires, where the first user equipment capability includes partial capability or all capability of the user equipment capability.

It should be noted that, if the received configuration message/activation message/switching message causes the frequency-domain position/the spatial domain position accessed by the user equipment to change, the replacement of the frequency-domain position and/or the spatial domain position based on the received message may still be performed even though the user equipment capability is not reported.

In a specific implementation, after the user equipment reports the first user equipment capability to the network device, a timing module (may be a timer implemented in software, which may be called prohibit timer for this assistance information) is started, and the timing module starts timing. Therefore, it may be determined whether a preset time expires according to the timing duration of the timing module.

It should be noted that the value of the preset time may be agreed by the technical specification or configured by the network device for the user equipment. For example, it may be delivered to the user equipment by configuring a default parameter for the user equipment. In addition, after the user equipment reports the first user equipment capability to the network device, the network device may start timing synchronously, and refuse to receive the user equipment capability reported by the user equipment or the capability part included in the first user equipment capability before the preset time expires.

It should also be noted that specific content of the user equipment capability may has multiple situations. For example, the first user equipment capability that the user equipment has reported to the network device may include only part of the content of the user equipment capability, which may only correspond to part of the configured frequency-domain position and/or spatial domain position, etc. After the user equipment has reported the first user equipment capability and before the preset time has expired, the user equipment may be completely prohibited from reporting any user equipment capability to the network device again, or it may simply prohibit the user equipment from reporting to the network device the capability part already included in the first user equipment capability which is reported at the last time, equivalent to prohibiting the user equipment from repeatedly reporting the same capability to avoid excessively increasing the processing load of the network device.

In a sixth implementation, for determining whether the user equipment capability needs to be reported, on the basis of the above manners, if the network device may send to the user equipment an enable message that allows the user equipment to report the capability or a disable message that prohibits the user equipment from reporting the capability, then, in the user equipment performing step 101 to determine whether the user equipment capability needs to be reported, it may be determined that the user equipment capability needs to be reported in a case that the enable message is received or the disable message is not received; or, it may be determined that the user equipment capability does not need to be reported in a case that the disable message is received or the enable message is not received.

The above examples illustrate various inspection manners for the user equipment to determine whether to report the user equipment capability to the network device. It can be understood that the above-mentioned various methods may be used alone or in combination, which is not limited in the present disclosure.

After it is determined that the user equipment capability needs to be reported to the network device, there are multiple optional and combinable solutions for specific content and form of reporting the user equipment capability of step 103. Descriptions are provided hereinafter in detail with examples.

Regarding the association relationship between the user equipment capability reported to the network device and the frequency-domain position and/or spatial domain position, there may be at least one of the following manners.

First manner: reporting the user equipment capability to the network device according to a frequency-domain position and/or a spatial domain position allowed to be configured for the user equipment, wherein the user equipment capability is associated with the frequency-domain position and/or the spatial domain position that are allowed to be configured.

Second manner: reporting the user equipment capability to the network device according to a frequency-domain position and/or a spatial domain position capable of being supported by the user equipment, wherein the user equipment capability is associated with the frequency-domain position and/or the spatial domain position that are capable of being supported.

Third manner: reporting the user equipment capability to the network device according to an initial configuration information of the user equipment, wherein the user equipment capability is associated with a frequency-domain position and/or a spatial domain position corresponding to the initial configuration information.

Fourth manner: reporting the user equipment capability to the network device according to an initial activation information of the user equipment, wherein the user equipment capability is associated with a frequency-domain position and/or a spatial domain position corresponding to the initial activation information.

It can be understood that when the above four manners are adopted, the information used to determine the associated frequency-domain position and/or spatial domain position may be determined according to hardware condition of the user equipment or agreement in the technical specification. Therefore, when the user equipment initially accesses the network, any of the four manners may be used to determine the user equipment capability reported to the network device. The four manners may also be used at any stage in the usage of the user equipment.

In addition to the above four manners, if the user equipment receives the message sent by the network device and accordingly determines that the user equipment capability needs to be reported, then, in reporting the user equipment capability to the network device, the user equipment capability may be reported to the network device based on the received message, where the reported user equipment capability is associated with the frequency-domain position and/or the spatial domain position corresponding to the received message. Specifically, the received message includes at least one of the following: a default configuration message, a configuration message, a default activation message, an activation message, a frequency-domain switching message, or, a spatial domain switching message. Corresponding to the different types of messages, any of the following cases may be specifically included.

Fifth manner: according to the default configuration message, reporting the capability of the user equipment to the network device, where the capability of the user equipment is associated with the frequency-domain position and/or the spatial domain position corresponding to the default configuration message;

Sixth manner: according to the configuration message, reporting the capability of the user equipment to the network device, where the capability of the user equipment is associated with the frequency-domain position and/or the spatial domain position corresponding to the configuration message;

Seventh manner: according to the default activation message, reporting the capability of the user equipment to the network device, where the capability of the user equipment is associated with the frequency-domain position and/or the spatial domain position corresponding to the default activation message;

Eighth manner: according to the activation message, reporting the capability of the user equipment to the network device, where the capability of the user equipment is associated with the frequency-domain position and/or the spatial domain position corresponding to the activation message;

Ninth manner: according to the frequency-domain switching message, reporting the capability of the user equipment to the network device, where the capability of the user equipment is associated with a target frequency-domain position corresponding to the frequency-domain switching message;

Tenth manner: according to the spatial domain switching message, reporting the capability of the user equipment to the network device, where the capability of the user equipment is associated with a target spatial domain position corresponding to the spatial domain switching message.

It can be understood that an optional method is that: if the user equipment receives the configuration message (or, for example, the activation message or the switching message) sent by the network device, the user equipment preferably only reports the user equipment capability associated with the frequency-domain position and/or the spatial domain position corresponding to the configuration message (or, for example, the activation message or the switching message). This is because, even if the user equipment reports user equipment capability associated with other frequency-domain positions and/or spatial domain positions (that is, portions of frequency-domain positions and/or spatial domain positions that are not configured/activated/switched by the network device), the network device does not need to schedule resources in these frequency-domain positions and/or spatial domain positions as the user equipment does not send or receive signals at these frequency-domain positions and/or spatial domain positions. Thus, reporting the capability associated with these frequency-domain positions and/or spatial domain positions do not directly contribute to improvement of utilization of system resource.

In a case, when the user equipment does not receive the configuration message and if it is still determined that the user equipment capability needs to be reported to the network device, then the frequency-domain position and/or the spatial domain position corresponding to the user equipment may be determined according to the default configuration information of the user equipment, and the user equipment capability associated with this frequency-domain position and/or spatial domain position are reported. Or, the capability of the user equipment associated with the frequency-domain position and/or spatial domain position allowed to be configured for, or capable of being supported by, or initially configured for, or initially activated for the user equipment may be directly reported.

In another case, when the user equipment does not receive the activation message and if it is still determined that the user equipment capability needs to be reported to the network device, then the frequency-domain and/or spatial domain position corresponding to the user equipment may be determined according to the default activation information or default configuration message of the user equipment, and the user equipment capability associated with this frequency-domain position and/or spatial domain position are reported. Or, the capability of the user equipment associated with the frequency-domain position and/or spatial domain position allowed to be configured for, or capable of being supported by, or initially configured for, or initially activated for the user equipment may be directly reported.

In another case, when the user equipment does not receive the frequency-domain switching message and the spatial domain switching message, it indicates that the frequency-domain position and/or the spatial domain position currently accessed by the user equipment do not need to be changed, so there is no need to report the user equipment capability to the network device.

Multiple possible manner for associating the user equipment capability reported by the user equipment and the frequency-domain position and/or the spatial domain position are described in the above with examples. It can be understood that, in reporting the user equipment capability, there are many possible situations for the form of the message as adopted. For example, the user equipment capability may be reported to the network device in at least one of the following manners:

sending a terminal capability message including the user equipment capability to the network device;

sending a radio resource control (RRC) message including the user equipment capability to the network device;

sending a user equipment assistance message including the user equipment capability to the network device;

sending, to the network device, a terminal capability message for reporting the user equipment capability;

sending, to the network device, a radio resource control (RRC) message for reporting the user equipment capability; or, sending, to the network device, a user equipment assistance message for reporting the user equipment capability.

It can be understood that, when the method of the embodiments of the present disclosure is used to report the user equipment capability, the user equipment capability associated with the frequency-domain position and/or the spatial domain position in the present disclosure may be added to one or more of conventional terminal capability message, radio resource control (RRC) message, or user equipment assistance message (UE assistance message); in addition, one or more of specific terminal capability message, radio resource control (RRC) message, or user equipment assistance message (UE assistance message) may be designed to report the user equipment capability associated with the frequency-domain position and/or the spatial domain position.

It should be noted that different contents in the user equipment capability may be reported in the same way or in different ways; and may be reported in the same message or by using multiple messages, which is not limited in the present disclosure When the user equipment reports the user equipment capability to the network device, it may directly report information associated with the capability of the user equipment in the frequency-domain position and/or the spatial position; it may report an index of information associated with the capability of the user equipment in the frequency-domain position and/or the spatial position; it may report assistance information associated with the capability of the user equipment in the frequency-domain position and/or the spatial domain position (the assistance information may be used by the network device to determine the information or the index associated with the capability of the user equipment in the frequency-domain position and/or the spatial domain position, for example, may be the limitation of the user equipment on the receiving and sending device, the constraint of the user equipment on the receiving and sending function, etc.); it may report the preferred capability of the user equipment, etc., for the network device to perform resource scheduling.

It should be noted that specific capability content that can be included in the user equipment capability is diverse, and the content that can be included in the user equipment capability may be different according to different frequency domain and/or spatial domain division manners. The multiple specific capability contents included in the user equipment capability may be reported in the same form and/or message, or may be reported in in different forms and/or messages; may be associated with the same frequency-domain position and/or spatial domain position, or may be associated with different frequency-domain positions and/or spatial domain positions, which is not limited in the present disclosure.

In the embodiments of the present disclosure, according to different division manners of the frequency domain, the frequency-domain position may correspond to any one of the following: a bandwidth part (BWP) identifier, a user equipment (UE) identifier, a band identifier, a band combination identifier, a component carrier identifier, or, a carrier identifier. According to different division manners of the spatial domain, the spatial domain position may correspond to any of the following: a beam identifier, a carrier identifier, a transmission point identifier, or, a quasi-co-location (QCL) identifier.

Taking a case where the frequency-domain position is corresponding to the bandwidth part (BWP) identifier as an example, the user equipment capability reported by the user equipment includes a capability of a certain bandwidth part (per-BWP capability). The user equipment UE may have different capabilities on the various bandwidth parts (BWP). When the configured BWP or the activated BWP changes, the user equipment (UE) may change part or all of the capability, which may include dynamically changing the capability of the UE and temporarily changing the capability of the UE, or, assistance information may be sent to the network device to assist the network to change the scheduling information, so as to adapt to different capabilities of the UE on different BWPs. Specifically, the per-BWP capability may include at least one of the following.

(1) Multiple-input multiple-output (MIMO) capability of each bandwidth part (BWP) that the user equipment can support. Specifically, the MIMO capability may further include at least one of the following: the number of MIMO layers, the number of MIMO antennas, the number of MIMO ports, the buffer size corresponding to MIMO, and so on.

(2) Parameter (numerology) capability of each bandwidth part that the user equipment can support. The Numerology capability may further include at least one of the following: subcarrier spacing, the length of the cyclic prefix (CP), the number of symbols in the time domain (symbol number) or the number of slots, the length of the transmission time interval (TTI), etc.

(3) The number of transmission layers (layer number) supported by the user equipment.

(4) One or more of: the number of bands, the number of band combinations, the number of carriers, or the number of component carriers, supported by the user equipment.

(5) The L2 buffer size and/or soft buffer size supported by the user equipment.

(6) One or more of: packet data convergence protocol (PDCP) layer parameter, radio link control (RLC) layer parameter, media access control (MAC) layer parameter, or physical layer (PHY) parameter, supported by the user equipment.

(7) Radio frequency parameter supported by user equipment.

(8) Measurement parameter supported by user equipment.

(9) Mobility parameter supported by user equipment.

(10) Whether the user equipment has the capability of scheduling across BWP.

(11) Whether the user equipment has the capability of fast retuning (for example, the capability to quickly adjust from receiving and sending with one BWP to receiving and sending with another BWP, under the premise of meeting certain performance requirements), and/or time interval or radio frequency requirements of retuning, etc.

(12) Whether the user equipment has the capability of measurement gap across BWP, that is, when the user equipment operates on a certain BWP, it indicates to measure whether a gap is required for another BWP.

(13) Whether the user equipment has the capability to measure different measurement performances of a BWP on the BWP, which may specifically include at least one of the following: reference signal received power (RSRP), reference signal received quality (RSRQ), signal to inference and noise ratio (SINR), received signal strength indicator (RSSI), channel quality indicator (CQI) and other channel quality feedback.

(14) Whether the user equipment has the capability to measure different measurement performances of another BWP on a BWP, which may specifically include at least one of the following: reference signal received power (RSRP), reference signal received quality (RSRQ), signal to inference and noise ratio (SINR), received signal strength indicator (RSSI), channel quality indicator (CQI) and other channel quality feedback. If it has, it may indicate to measure whether the capacity of measurement gap is required by a certain measurement quantity.

(15) The user equipment is configured on a BWP, and when it is configured by the network side that a channel sounding reference signal (SRS) needs to be sent for uplink measurement, it indicates whether the capability of measurement gap is required.

(16) The user equipment is activated on a certain BWP, it indicates whether the measurement gap is required for receiving/sending multi-beam measurement during co-frequency measurement.

(17) The maximum number of BWPs and/or bandwidth capability of uplink and/or downlink that the user equipment supports to configure simultaneously.

(18) The maximum number of BWPs and/or bandwidth capability of uplink and/or downlink that the user equipment supports to activate simultaneously.

(19) The number of continuous/non-continuous BWPs and/or bandwidth capability per carrier frequency that the user equipment supports to configure simultaneously.

(20) The number of continuous/non-continuous BWPs and/or bandwidth capability per carrier frequency that the user equipment supports to activate simultaneously.

(21) The number of continuous/non-continuous BWPs and/or bandwidth capability in different carrier frequencies that the user equipment supports to configure simultaneously (may be carrier aggregation (CA) and/or dual connection (DC)).

(22) The number of continuous/non-continuous BWPs and/or bandwidth capability in different carrier frequencies that the user equipment supports to activate simultaneously (may be carrier aggregation (CA) and/or dual connection (DC)).

The user equipment capability associated with the spatial domain position reported by the user equipment may be one or more of: the number of uplink transmission antennas, the maximum power of uplink transmission, the bandwidth that the UE can support, or the frequency point that the UE can support.

In the embodiments of the present disclosure, the capability associated with the frequency-domain position and/or the spatial domain position is reported by the user equipment to the network device. In this way, the network device can schedule resource occupation of the user equipment in the corresponding frequency-domain position and/or spatial domain position according to the capability reported by the user equipment, which achieves flexible scheduling of system resource and improves utilization of system resource.

Second Embodiment

Figure 2:
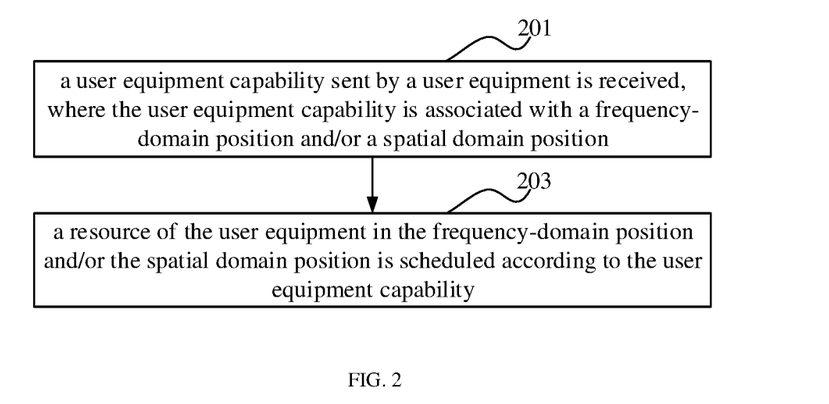
FIG. 2 is a schematic flowchart of a method for resource scheduling provided by embodiments of the present disclosure.

Corresponding to the method for reporting the user equipment capability performed by the user equipment provided in the first embodiment in the above, the present disclosure also provides a method for resource scheduling performed by a network device. Referring to FIG. 2, the method includes the following steps.

Step 201 includes: receiving a user equipment capability sent by a user equipment, wherein the user equipment capability is associated with a frequency-domain position and/or a spatial domain position.

Step 203 includes scheduling a resource of the user equipment in the frequency-domain position and/or the spatial domain position according to the user equipment capability.

Optionally, the network device may send at least one of the following messages to the user equipment for the user equipment to determine whether the user equipment capability needs to be reported:

a default configuration message, used to configure the user equipment with a parameter including a frequency-domain position and/or a spatial domain position;

a configuration message, used to configure a frequency-domain position and/or a spatial domain position for the user equipment;

a default activation message, used to set, for the user equipment, a frequency-domain position and/or a spatial domain position that are activated by default;

an activation message, used to activate a frequency-domain position and/or a spatial domain position for the user equipment;

a frequency-domain switching message, used to indicate the user equipment to switch to a target frequency-domain position; or, a spatial domain switching message, used to indicate the user equipment to switch to a target spatial domain position.

It can be understood that the network device may send the above-mentioned message to the user equipment when needed, so as to adjust the frequency-domain position and/or the spatial domain position which the user equipment accesses/allows to access. After receiving these messages, the user equipment may further determine whether the user equipment capability needs to be reported to the network device.

Specifically, the network device may send the above message in at least one of the following manners:

a radio resource control (RRC) message, a media access control (MAC) control element, or, downlink control indication (DCI) corresponding to a downlink control channel.

Optionally, the network device may send, to the user equipment, an enable message that allows the user equipment to report a capability or a disable message that prohibits the user equipment from reporting a capability, so that the user equipment determines whether the user equipment capability needs to be reported to the network device.

Specifically, the network device receiving the user equipment capability sent by the user equipment may be at least one of the following manners:

receiving a terminal capability message including the user equipment capability, wherein the terminal capability message is sent by the user equipment;

receiving a radio resource control (RRC) message including the user equipment capability, wherein the RRC message is sent by the user equipment;

receiving a user equipment assistance message including the user equipment capability, wherein the user equipment assistance message is sent by the user equipment;

receiving a terminal capability message for reporting the user equipment capability, wherein the terminal capability message is sent by the user equipment;

receiving a radio resource control (RRC) message for reporting the user equipment capability, wherein the RRC message is sent by the user equipment; or, receiving a user equipment assistance message for reporting the user equipment capability, wherein the user equipment assistance message is sent by the user equipment.

It can be understood that the manner in which the network device receives the user equipment capability corresponds to the manner in which the user equipment reports the user equipment capability, which is not repeated herein.

Specifically, the user equipment capability received by the network device may include at least one of the following:

information associated with a capability of the user equipment in the frequency-domain position and/or the spatial domain position;

an index of information associated with a capability of the user equipment in the frequency-domain position and/or the spatial domain position;

assistance information associated with a capability of the user equipment in the frequency-domain position and/or the spatial domain position; or, a preferred capability of the user equipment.

Further, in a case that the user equipment capability includes the assistance information associated with the capability of the user equipment in the frequency-domain position and/or the spatial domain position, the scheduling the resource of the user equipment in the frequency-domain position and/or the spatial domain position according to the user equipment capability may include:

determining, according to the assistance information, information associated with the capability of the user equipment in the frequency-domain position and/or spatial domain position, or an index of information associated with the capability of the user equipment in the frequency-domain position and/or the spatial domain position; and scheduling, according to the information or the index associated with the capability of the user equipment in the frequency-domain position and/or the spatial domain position, the resource of the user equipment in the frequency-domain position and/or the spatial domain position.

The frequency-domain position applicable to the embodiments of the present disclosure may correspond to any one of the following: a bandwidth part (BWP) identifier, a user equipment (UE) identifier, a band identifier, a band combination identifier, a component carrier identifier, or, a carrier identifier.

The spatial domain position applicable to the embodiments of the present disclosure may correspond to any one of the following: a beam identifier, a carrier identifier, a transmission point identifier, or, a quasi-co-location (QCL) identifier.

In the method for resource scheduling performed by the network device provided by the embodiments of the present disclosure, after the user equipment capability reported by the user equipment and associated with the frequency-domain position and/or the spatial domain position is reported, the resource occupancy of the user equipment in the corresponding frequency-domain position and/or spatial domain position can be scheduled according to the capability reported by the user equipment, thereby achieving flexible scheduling of system resource and improving utilization of system resource.

Third Embodiment

Figure 3:
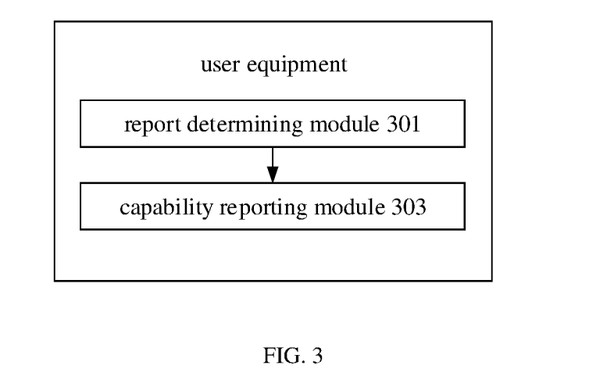
FIG. 3 is a schematic structural diagram of a user equipment provided by embodiments of the present disclosure.

Embodiments of the present disclosure also provide a user equipment. Referring to FIG. 3, the user equipment includes:

a report determining module 301, configured to determine whether a user equipment capability needs to be reported, wherein the user equipment capability is associated with a frequency-domain position and/or a spatial domain position; and a capability reporting module 303, configured to report the user equipment capability to a network device in a case that it is determined that the user equipment capability needs to be reported.

Optionally, the report determining module 301 may specifically include:

a first determining unit, configured to determine that the user equipment capability needs to be reported, in a case that the user equipment initially accesses a network; and/or, a second determining unit, configured to determine that the user equipment capability needs to be reported, in a case that a message sent by the network device is received.

Optionally, the report determining module 301 may specifically include:

a third determining unit, configured to determine that the user equipment capability needs to be reported, in a case that a message sent by the network device is received, and a frequency-domain position and/or a spatial domain position corresponding to the user equipment change according to the message.

Optionally, the report determining module 301 may specifically include:

a fourth determining unit, configured to determine that the user equipment capability needs to be reported, in a case that a message sent by the network device is received, a frequency-domain position and/or a spatial domain position corresponding to the user equipment change according to the message, and the changed frequency-domain position and/or the changed spatial domain position are a frequency-domain position and/or a spatial domain position capable of being supported by the user equipment; and/or, a fifth determining unit, configured to determine that the user equipment capability does not need to be reported and/or determine that the user equipment ignores the message sent by the network device, in a case that the message sent by the network device is received, the frequency-domain position and/or the spatial domain position corresponding to the user equipment change according to the message, and the changed frequency-domain position and/or the changed spatial domain position are not a frequency-domain position and/or a spatial domain position capable of being supported by the user equipment.

Optionally, the user equipment may further include:

a first message receiving module, configured to receive at least one of the following messages sent by the network device:

a default configuration message, used to configure the user equipment with a parameter including a frequency-domain position and/or a spatial domain position;

a configuration message, used to configure a frequency-domain position and/or a spatial domain position for the user equipment;

a default activation message, used to set, for the user equipment, a frequency-domain position and/or a spatial domain position that are activated by default;

an activation message, used to activate a frequency-domain position and/or a spatial domain position for the user equipment;

a frequency-domain switching message, used to indicate the user equipment to switch to a target frequency-domain position; or, an activation message, used to activate a frequency-domain position and/or a spatial domain position for the user equipment;

a spatial domain switching message, used to indicate the user equipment to switch to a target spatial domain position.

Optionally, the report determining module 301 may specifically include:

a sixth determining unit, configured to determine that the user equipment capability does not need to be reported or determine that a capability part included in a first user equipment capability does not need to be reported, after the first user equipment capability is reported to the network device and before a preset time expires; and the first user equipment capability includes partial capability or all capability of the user equipment capability.

Optionally, the user equipment may further include:

a second message receiving module, configured to receive an enable message that allows the user equipment to report a capability or a disable message that prohibits the user equipment from reporting a capability, wherein the enable message or the disable message is sent by the network device;

the report determining module 301 may specifically include:

a seventh determining unit, configured to determine that the user equipment capability needs to be reported, in a case that the enable message is received or the disable message is not received; or, an eighth determining unit, configured to determine that the user equipment capability does not need to be reported, in a case that the disable message is received or the enable message is not received.

Optionally, the capability reporting module 303 may specifically include at least one of the following:

a first capability reporting unit, configured to report the user equipment capability to the network device according to a frequency-domain position and/or a spatial domain position allowed to be configured for the user equipment, wherein the user equipment capability is associated with the frequency-domain position and/or the spatial domain position that are allowed to be configured;

a second capability reporting unit, configured to report the user equipment capability to the network device according to a frequency-domain position and/or a spatial domain position capable of being supported by the user equipment, wherein the user equipment capability is associated with the frequency-domain position and/or the spatial domain position that are capable of being supported;

a third capability reporting unit, configured to report the user equipment capability to the network device according to an initial configuration information of the user equipment, wherein the user equipment capability is associated with a frequency-domain position and/or a spatial domain position corresponding to the initial configuration information; or, a fourth capability reporting unit, configured to report the user equipment capability to the network device according to an initial activation information of the user equipment, wherein the user equipment capability is associated with a frequency-domain position and/or a spatial domain position corresponding to the initial activation information.

Optionally, when the report determining module 301 includes the second determining unit, the capability reporting module 303 may specifically include:

a fifth capability reporting unit, configured to report the user equipment capability to the network device according to the received message, where the user equipment capability is associated with the frequency-domain position and/or the spatial domain position corresponding to the received message;

the received message includes at least one of the following: a default configuration message, a configuration message, a default activation message, an activation message, a frequency-domain switching message, or a spatial domain switching message.

Optionally, the capability reporting module 303 may be specifically configured to report the capability of the user equipment to the network device in at least one of the following manners:

sending a terminal capability message including the user equipment capability to the network device;

sending a radio resource control (RRC) message including the user equipment capability to the network device;

sending a user equipment assistance message including the user equipment capability to the network device;

sending, to the network device, a terminal capability message for reporting the user equipment capability;

sending, to the network device, a radio resource control (RRC) message for reporting the user equipment capability; or, sending, to the network device, a user equipment assistance message for reporting the user equipment capability.

Optionally, the user equipment capability may include at least one of the following:

information associated with a capability of the user equipment in the frequency-domain position and/or the spatial domain position;

an index of information associated with a capability of the user equipment in the frequency-domain position and/or the spatial domain position;

assistance information associated with a capability of the user equipment in the frequency-domain position and/or the spatial domain position, wherein the assistance information is used for the network device to determine information or an index associated with the capability of the user equipment in the frequency-domain position and/or the spatial domain position; or, a preferred capability of the user equipment.

Optionally, the frequency-domain position may correspond to any one of the following: a bandwidth part (BWP) identifier, a user equipment (UE) identifier, a band identifier, a band combination identifier, a component carrier identifier, or, a carrier identifier.

The spatial domain position may correspond to any one of the following: a beam identifier, a carrier identifier, a transmission point identifier, or, a quasi-co-location (QCL) identifier.

Optionally, the user equipment may further include:

a signal transceiving module, configured to receive and send signals according to a resource scheduled by the network device according to the user equipment capability.

The user equipment provided in the third embodiments corresponds to the user equipment that reports the capability of the user equipment provided in the embodiments shown in FIG. 1, and can implement various processes implemented by the user equipment in the method embodiment of FIG. 1. The related descriptions in the embodiment shown in FIG. 1 are all applicable to this embodiment, which will not be repeated herein.

In the embodiments of the present disclosure, the capability associated with the frequency-domain position and/or the spatial domain position is reported by the user equipment to the network device. In this way, the network device can schedule resource occupation of the user equipment in the corresponding frequency-domain position and/or spatial domain position according to the capability reported by the user equipment, which achieves flexible scheduling of system resource and improves utilization of system resource.

Fourth Embodiment

Figure 4:
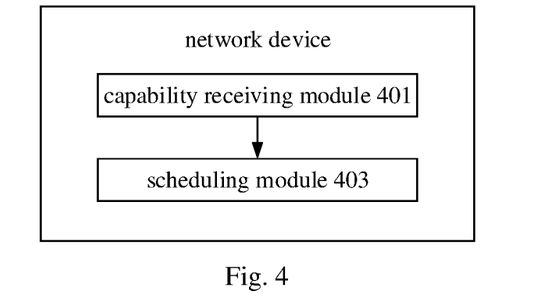
FIG. 4 is a schematic structural diagram of a network device according to embodiments of the present disclosure.

Embodiments of the present disclosure also provide a network device. Referring to FIG. 4, the network device includes:

a capability receiving module 401, configured to receive a user equipment capability sent by a user equipment, wherein the user equipment capability is associated with a frequency-domain position and/or a spatial domain position; and a scheduling module 403, configured to schedule a resource of the user equipment in the frequency-domain position and/or the spatial domain position according to the user equipment capability.

Optionally, the network device may further include:

a first message sending module, configured to send at least one of the following messages to the user equipment for the user equipment to determine whether the user equipment capability needs to be reported:

a default configuration message, used to configure the user equipment with a parameter including a frequency-domain position and/or a spatial domain position;

a configuration message, used to configure a frequency-domain position and/or a spatial domain position for the user equipment;

a default activation message, used to set, for the user equipment, a frequency-domain position and/or a spatial domain position that are activated by default;

an activation message, used to activate a frequency-domain position and/or a spatial domain position for the user equipment;

a frequency-domain switching message, used to indicate the user equipment to switch to a target frequency-domain position; or, a spatial domain switching message, used to indicate the user equipment to switch to a target spatial domain position.

Optionally, the first message sending module may send the message in at least one of the following manners:

a radio resource control (RRC) message, a media access control (MAC) control element, or, downlink control indication (DCI) corresponding to a downlink control channel.

Optionally, the network device may further include:

a second message sending module, configured to send to the user equipment an enable message that allows the user equipment to report a capability or a disable message that prohibits the user equipment from reporting a capability.

Optionally, the capability receiving module 401 may specifically include at least one of the following:

a first capability receiving unit, configured to receive a terminal capability message including the user equipment capability, wherein the terminal capability message is sent by the user equipment;

a second capability receiving unit, configured to receive a radio resource control (RRC) message including the user equipment capability, wherein the RRC message is sent by the user equipment;

a third capability receiving unit, configured to receive a user equipment assistance message including the user equipment capability, wherein the user equipment assistance message is sent by the user equipment;

a fourth capability receiving unit, configured to receive a terminal capability message for reporting the user equipment capability, wherein the terminal capability message is sent by the user equipment;

a fifth capability receiving unit, configured to receive a radio resource control (RRC) message for reporting the user equipment capability, wherein the RRC message is sent by the user equipment; or, a sixth capability receiving unit, configured to receive a user equipment assistance message for reporting the user equipment capability, wherein the user equipment assistance message is sent by the user equipment.

Optionally, if the user equipment capability includes assistance information associated with the capability of the user equipment in the frequency-domain position and/or the spatial domain position, the scheduling module 403 may specifically include:

an information/index determining unit, configured to determine, based on the assistance information, the information associated with the capability of the user equipment in the frequency-domain position and/or the spatial domain position or the index of the information associated with the capability of the user equipment in the frequency-domain position and/or spatial domain position; and a scheduling unit, configured to schedule the resource of the user equipment in the frequency-domain position and/or the spatial domain position according to the information or index associated with the capability of the user equipment in the frequency-domain position and/or the spatial domain position.

Optionally, the frequency-domain position applicable to the network device may correspond to any one of the following: a bandwidth part (BWP) identifier, a user equipment (UE) identifier, a band identifier, a band combination identifier, a component carrier identifier, or, a carrier identifier; and/or, the spatial domain position applicable to the network device may correspond to any one of the following: a beam identifier, a carrier identifier, a transmission point identifier, or, a quasi-co-location (QCL) identifier.

The network device provided in the fourth embodiment corresponds to the network device that performs the method for resource scheduling provided in the embodiment shown in FIG. 2. The related descriptions in the embodiments shown in FIG. 1 and FIG. 2 are both applicable to this embodiment, which will not be repeated herein.

The network device provided by the embodiments of the present disclosure can perform the method for resource scheduling in the above. After the user equipment capability reported by the user equipment and associated with the frequency-domain position and/or the spatial domain position is reported, the resource occupancy of the user equipment in the corresponding frequency-domain position and/or spatial domain position can be scheduled according to the capability reported by the user equipment, thereby achieving flexible scheduling of system resource and improving utilization of system resource.

Fifth Embodiment

Figure 5:
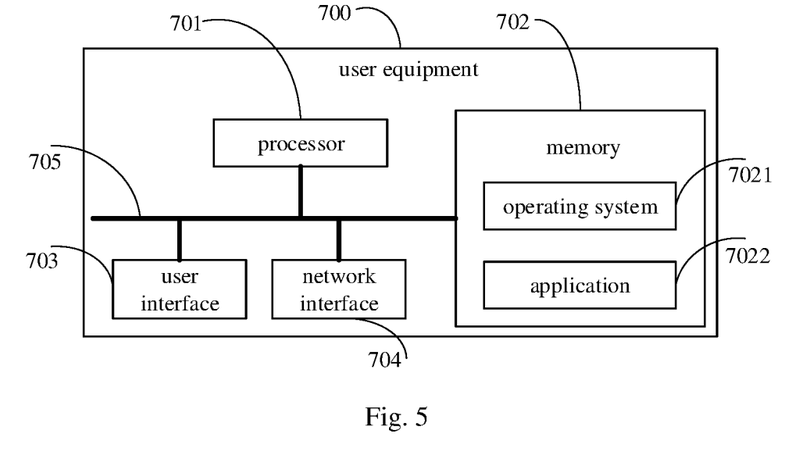
FIG. 5 is another schematic structural diagram of a user equipment provided by embodiments of the present disclosure.

FIG. 5 is a block diagram of a user equipment according to another embodiment of the present disclosure. The user equipment 700 shown in FIG. 5 includes: at least one processor 701, a memory 702, at least one network interface 704, and a user interface 703. The various components in the user equipment 700 are coupled together through a bus system 705. It can be understood that the bus system 705 is configured to implement connection and communication between these components. In addition to a data bus, the bus system 705 includes a power bus, a control bus, and a state signal bus. However, for clarity, various buses are marked as the bus system 705 in FIG. 7.

The user interface 703 may include a display, a keyboard, a clicking device (such as, a mouse, or a trackball), a touch pad, or a touch screen.

It can be understood that the memory 702 in the embodiments of the present disclosure may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) or a direct rambus random access memory (Direct Rambus RAM, DRRAM). The memory 702 in the system and the method of the embodiments of the present disclosure is intended to include, without being limited to, these and any other suitable types of memories.

In some implementations, the memory 702 stores the following elements, executable modules or data structures, or a subset thereof, or an extended set thereof: operating system 7021 and application 7022.

The operating system 7021 includes various system programs such as a framework layer, a core library layer and a driving layer, for implementing various fundamental services and processing hardware-based tasks. The application 7022 includes various applications such as media player and browser, for implementing various application services. A program for implementing the method according to the embodiments of the present disclosure may be included in the application 7022.

In the embodiments of the present disclosure, the user equipment further includes a computer program stored in the memory and executable by the processor. When the computer program is executed by the processor, the following steps are implemented:

determining whether a user equipment capability needs to be reported, wherein the user equipment capability is associated with a frequency-domain position and/or a spatial domain position; and reporting, in a case that it is determined that the user equipment capability needs to be reported, the user equipment capability to a network device.

The method according to the above embodiments of the present disclosure may be applied to the processor 701 or implemented by the processor 701. The processor 701 may be an integrated circuit chip with signal processing capabilities. In implementation, each step of the foregoing methods may be completed by an integrated logic circuit in form of hardware in the processor 701 or instructions in form of software. The processor 701 above may be a general-purpose processor, a digital signal processor (DSP), an application specific integrated circuit (ASIC), a field programmable gate array (FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module may be located in a conventional well-developed computer readable storage medium such as a random access memory, a flash memory, a read-only memory, a programmable read-only memory, an electrically erasable programmable memory, a register, or the like. The computer readable storage medium is located in the memory, and the processor reads the information in the memory and completes the steps of the above methods in combination with its hardware. Specifically, a computer program is stored on the computer readable storage medium, and when the computer program is executed by the processor, the steps of the embodiments directed to the method are implemented.

It can be understood that the embodiments described herein may be implemented in hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, other electronics units for performing the functions according to the present disclosure or a combination thereof.

For software implementation, the technical solutions according to the embodiments of the present disclosure may be implemented by modules (e.g., processes, functions, and so on) for performing the functions according to the embodiments of the present disclosure. Software codes may be stored in a memory and executed by a processor. The memory may be implemented in the processor or external to the processor.

Optionally, when the computer program is executed by the processor, other steps in the first embodiments may be implemented.

The user equipment 700 may implement various processes implemented by the user equipment in the foregoing embodiments. To avoid repetition, details are not repeated herein.

In the embodiments of the present disclosure, the capability associated with the frequency-domain position and/or the spatial domain position is reported by the user equipment to the network device. In this way, the network device can schedule resource occupation of the user equipment in the corresponding frequency-domain position and/or spatial domain position according to the capability reported by the user equipment, which achieves flexible scheduling of system resource and improves utilization of system resource.

Embodiments of the present disclosure also provide a user equipment, including a processor, a memory, and a computer program stored on the memory and executable by the processor. When the computer program is executed by the processor, the various processes of the method for reporting the user equipment capability described above are implemented, which can achieve the same technical effect. To avoid repetition, details are not repeated herein.

Embodiments of the present disclosure also provide a computer readable storage medium, having a computer program stored thereon. When the computer program is executed by a processor, various processes of the embodiments of the method for reporting the user equipment capability in the first embodiment described above are implemented, which can achieve the same technical effect. To avoid repetition, details are not repeated herein. The computer readable storage medium may be, for example read-only memory (ROM), random access memory RAM), magnetic disk or optical disk, etc.

Sixth Embodiment

Figure 6:
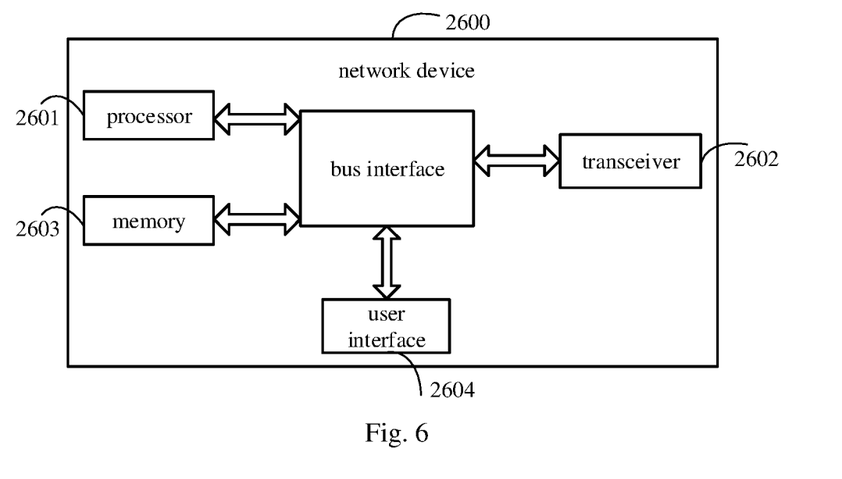
FIG. 6 is another schematic structural diagram of a network device provided by embodiments of the present disclosure.

Referring to FIG. 6, FIG. 6 is a structural diagram of a network device applied in embodiments of the present disclosure, which can implement the details of the resource configuration method in the second embodiment and achieve the same effect. As shown in FIG. 6, the network device 2600 includes: a processor 2601, a transceiver 2602, a memory 2603, a user interface 2604, and a bus interface.

In the embodiments of the present disclosure, the network device 2600 further includes: a computer program stored in the memory 2603 and executable by the processor 2601. The computer program is executed by the processor 2601 to implement the following steps:

receiving a user equipment capability sent by a user equipment, wherein the user equipment capability is associated with a frequency-domain position and/or a spatial domain position; and scheduling a resource of the user equipment in the frequency-domain position and/or the spatial domain position according to the user equipment capability.

In FIG. 6, the bus architecture may include any quantity of interconnected buses and bridges, and various circuits such as one or more processors represented by the processor 2601 and memory represented by the memory 2603 are connected to each other. The bus architecture may connect a variety of other circuits such as peripherals, voltage regulators and power management circuits to each other, which is well known in the art, thus no further description thereof will be given herein. The bus interface provides an interface. The transceiver 2602 may include multiple components, i.e. transmitter and receiver, which are used to provide a unit for communicating with other devices via a transmission medium. For different user equipments, the UI 2604 may also be an interface capable of connecting externally or internally to a required device, and the device which may be connected includes, but is not limited to: keypad, display, speaker, microphone, joystick and the like.

The processor 2601 is responsible for managing the bus architecture and normal operation and the memory 2603 may store the data being used by the processor 2601 during operation.

The network device provided by the embodiments of the present disclosure can execute the foregoing method for resource scheduling. After the user equipment capability reported by the user equipment and associated with the frequency-domain position and/or the spatial domain position is reported, the resource occupancy of the user equipment in the corresponding frequency-domain position and/or spatial domain position can be scheduled according to the capability reported by the user equipment, thereby achieving flexible scheduling of system resource and improving utilization of system resource.

Optionally, when the computer program is executed by the processor 2603, other steps in the second embodiment may be implemented, which is not repeated herein Embodiments of the present disclosure also provide a network device, including a processor, a memory, and a computer program stored on the memory and executable by the processor. When the computer program is executed by the processor, various processes of the above method embodiments for resource scheduling are implemented, which can achieve the same technical effect. To avoid repetition, details are not be repeated herein.

Embodiments of the present disclosure further provide a computer readable storage medium. A computer program is stored on the computer readable storage medium. When the computer program is executed by a processor, various processes of the embodiments of the above method for resource scheduling are implemented, which can achieve the same technical effects. To avoid repetition, details are not described herein. The computer readable storage medium is, for example, a read-only memory (ROM), a random access memory (RAM), a magnetic disk or an optical disk.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments may be implemented by means of software plus a necessary universal hardware platform, and also may be implemented by hardware, but in many cases the former is preferred. Based on this understanding, the technical solution of the present disclosure that is essential or contributes to the related technologies may be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for reporting a user equipment capability, performed by a user equipment, comprising:
    determining whether the user equipment capability needs to be reported, wherein the user equipment capability is associated with a frequency-domain position and/or a spatial domain position; and
    reporting, in a case that it is determined that the user equipment capability needs to be reported, the user equipment capability to a network device;
    wherein the determining whether the user equipment capability needs to be reported comprises:
    determining that the user equipment capability needs to be reported, in a case that a message sent by the network device is received, a frequency-domain position and/or a spatial domain position corresponding to the user equipment change according to the message, and the changed frequency-domain position and/or the changed spatial domain position are a frequency-domain position and/or a spatial domain position capable of being supported by the user equipment; and/or,
    determining that the user equipment capability does not need to be reported and/or determining that the user equipment ignores the message sent by the network device, in a case that the message sent by the network device is received, the frequency-domain position and/or the spatial domain position corresponding to the user equipment change according to the message, and the changed frequency-domain position and/or the changed spatial domain position are not a frequency-domain position and/or a spatial domain position capable of being supported by the user equipment.

2. The method according to claim 1, wherein the message sent by the network device comprises at least one of the following:
    a default configuration message, used to configure the user equipment with a parameter comprising a frequency-domain position and/or a spatial domain position;
    a configuration message, used to configure a frequency-domain position and/or a spatial domain position for the user equipment;
    a default activation message, used to set, for the user equipment, a frequency-domain position and/or a spatial domain position that are activated by default;
    an activation message, used to activate a frequency-domain position and/or a spatial domain position for the user equipment;
    a frequency-domain switching message, used to indicate the user equipment to switch to a target frequency-domain position; or,
    a spatial domain switching message, used to indicate the user equipment to switch to a target spatial domain position.

3. The method according to claim 1, wherein the message sent by the network device is sent by the network device in at least one of the following manners: a radio resource control (RRC) message, a media access control (MAC) control element, or, downlink control indication (DCI) corresponding to a downlink control channel.

4. The method according to claim 1, wherein the determining whether the user equipment capability needs to be reported comprises: determining that the user equipment capability does not need to be reported or determining that a capability part comprised in a first user equipment capability does not need to be reported, after the first user equipment capability is reported to the network device and before a preset time expires;
    wherein the first user equipment capability comprises partial capability or all capability of the user equipment capability.

5. The method according to claim 1, further comprising: receiving, an enable message that allows the user equipment to report a capability or a disable message that prohibits the user equipment from reporting a capability, wherein the enable message or the disable message is sent by the network device;
    wherein the determining whether the user equipment capability needs to be reported, comprising:
    determining that the user equipment capability needs to be reported, in a case that the enable message is received or the disable message is not received; or,
    determining that the user equipment capability does not need to be reported, in a case that the disable message is received or the enable message is not received.

6. The method according to claim 1, wherein the reporting the user equipment capability to the network device comprises at least one of the following manners:
    reporting the user equipment capability to the network device according to a frequency-domain position and/or a spatial domain position allowed to be configured for the user equipment, wherein the user equipment capability is associated with the frequency-domain position and/or the spatial domain position that are allowed to be configured;
    reporting the user equipment capability to the network device according to a frequency-domain position and/or a spatial domain position capable of being supported by the user equipment, wherein the user equipment capability is associated with the frequency-domain position and/or the spatial domain position that are capable of being supported;
    reporting the user equipment capability to the network device according to an initial configuration information of the user equipment, wherein the user equipment capability is associated with a frequency-domain position and/or a spatial domain position corresponding to the initial configuration information; or,
    reporting the user equipment capability to the network device according to an initial activation information of the user equipment, wherein the user equipment capability is associated with a frequency-domain position and/or a spatial domain position corresponding to the initial activation information.

7. The method according to claim 1, wherein after the determining that the user equipment capability needs to be reported in a case that the message sent by the network device is received, the reporting the user equipment capability to the network device comprises: reporting the user equipment capability to the network device according to the received message, wherein the user equipment capability is associated with a frequency-domain position and/or a spatial domain position corresponding to the received message; and wherein the received message comprises at least one of the following: a default configuration message, a configuration message, a default activation message, an activation message, a frequency-domain switching message, or, a spatial domain switching message.

8. The method according to claim 1, wherein the reporting the user equipment capability to the network device comprises at least one of the following manners:

sending a terminal capability message comprising the user equipment capability to the network device;

sending a radio resource control (RRC) message comprising the user equipment capability to the network device;

sending a user equipment assistance message comprising the user equipment capability to the network device;

sending, to the network device, a terminal capability message for reporting the user equipment capability;

sending, to the network device, a radio resource control (RRC) message for reporting the user equipment capability; or, sending, to the network device, a user equipment assistance message for reporting the user equipment capability.

9. The method according to claim 1, wherein the user equipment capability comprises at least one of the following:

information associated with a capability of the user equipment in the frequency-domain position and/or the spatial domain position;

an index of information associated with a capability of the user equipment in the frequency-domain position and/or the spatial domain position;

assistance information associated with a capability of the user equipment in the frequency-domain position and/or the spatial domain position, wherein the assistance information is used for the network device to determine information or an index associated with the capability of the user equipment in the frequency-domain position and/or the spatial domain position; or, a preferred capability of the user equipment.

10. The method according to claim 1, wherein:

the frequency-domain position corresponds to any of the following: a bandwidth part (BWP) identifier, a user equipment (UE) identifier, a band identifier, a band combination identifier, a component carrier identifier, or, a carrier identifier; and/or, the spatial domain position corresponds to any of the following: a beam identifier, a carrier identifier, a transmission point identifier, or, a quasi-co-location (QCL) identifier.

11. The method according to claim 1, wherein after the reporting the user equipment capability to the network device, the method further comprises: receiving and sending signals according to a resource scheduled by the network device according to the user equipment capability.

12. A user equipment, comprising a memory, a processor, and a program stored on the memory and executable by the processor, wherein the processor is configured to execute the program to:

determine whether a user equipment capability needs to be reported, wherein the user equipment capability is associated with a frequency-domain position and/or a spatial domain position; and report the user equipment capability to a network device in a case that it is determined that the user equipment capability needs to be reported;

wherein the determining whether the user equipment capability needs to be reported comprises:

determining that the user equipment capability needs to be reported, in a case that a message sent by the network device is received, a frequency-domain position and/or a spatial domain position corresponding to the user equipment change according to the message, and the changed frequency-domain position and/or the changed spatial domain position are a frequency-domain position and/or a spatial domain position capable of being supported by the user equipment; and/or, determining that the user equipment capability does not need to be reported and/or determining that the user equipment ignores the message sent by the network device, in a case that the message sent by the network device is received, the frequency-domain position and/or the spatial domain position corresponding to the user equipment change according to the message, and the changed frequency-domain position and/or the changed spatial domain position are not a frequency-domain position and/or a spatial domain position capable of being supported by the user equipment.

13. The user equipment according to claim 12, wherein the message sent by the network device comprises at least one of the following:

a default configuration message, used to configure the user equipment with a parameter comprising a frequency-domain position and/or a spatial domain position;

a configuration message, used to configure a frequency-domain position and/or a spatial domain position for the user equipment;

a default activation message, used to set, for the user equipment, a frequency-domain position and/or a spatial domain position that are activated by default;

an activation message, used to activate a frequency-domain position and/or a spatial domain position for the user equipment;

a frequency-domain switching message, used to indicate the user equipment to switch to a target frequency-domain position; or, a spatial domain switching message, used to indicate the user equipment to switch to a target spatial domain position.

14. The user equipment according to claim 12, wherein the message sent by the network device is sent by the network device in at least one of the following manners: a radio resource control (RRC) message, a media access control (MAC) control element, or, downlink control indication (DCI) corresponding to a downlink control channel.

15. The user equipment according to claim 12, wherein the determining whether the user equipment capability needs to be reported comprises: determining that the user equipment capability does not need to be reported or determining that a capability part comprised in a first user equipment capability does not need to be reported, after the first user equipment capability is reported to the network device and before a preset time expires;

wherein the first user equipment capability comprises partial capability or all capability of the user equipment capability.

16. A method for reporting a user equipment capability, performed by a user equipment, comprising:

determining whether the user equipment capability needs to be reported, wherein the user equipment capability is associated with a frequency-domain position and/or a spatial domain position; and reporting, in a case that it is determined that the user equipment capability needs to be reported, the user equipment capability to a network device;

wherein the reporting the user equipment capability to the network device comprises at least one of the following manners:

reporting the user equipment capability to the network device according to a frequency-domain position and/or a spatial domain position allowed to be configured for the user equipment, wherein the user equipment capability is associated with the frequency-domain position and/or the spatial domain position that are allowed to be configured;

reporting the user equipment capability to the network device according to a frequency-domain position and/or a spatial domain position capable of being supported by the user equipment, wherein the user equipment capability is associated with the frequency-domain position and/or the spatial domain position that are capable of being supported;

reporting the user equipment capability to the network device according to an initial configuration information of the user equipment, wherein the user equipment capability is associated with a frequency-domain position and/or a spatial domain position corresponding to the initial configuration information; or, reporting the user equipment capability to the network device according to an initial activation information of the user equipment, wherein the user equipment capability is associated with a frequency-domain position and/or a spatial domain position corresponding to the initial activation information.

17. The method according to claim 16, wherein the determining whether the user equipment capability needs to be reported comprises:

determining that the user equipment capability needs to be reported, in a case that the user equipment initially accesses a network; and/or, determining that the user equipment capability needs to be reported, in a case that a message sent by the network device is received.

18. The method according to claim 16, wherein the determining whether the user equipment capability needs to be reported comprises: determining that the user equipment capability needs to be reported, in a case that a message sent by the network device is received, and a frequency-domain position and/or a spatial domain position corresponding to the user equipment change according to the message.

19. The method according to claim 17, wherein the message sent by the network device comprises at least one of the following:

a default configuration message, used to configure the user equipment with a parameter comprising a frequency-domain position and/or a spatial domain position;

a configuration message, used to configure a frequency-domain position and/or a spatial domain position for the user equipment;

a default activation message, used to set, for the user equipment, a frequency-domain position and/or a spatial domain position that are activated by default;

an activation message, used to activate a frequency-domain position and/or a spatial domain position for the user equipment;

a frequency-domain switching message, used to indicate the user equipment to switch to a target frequency-domain position; or, a spatial domain switching message, used to indicate the user equipment to switch to a target spatial domain position.

20. The method according to claim 16, wherein:

the frequency-domain position corresponds to any of the following: a bandwidth part (BWP) identifier, a user equipment (UE) identifier, a band identifier, a band combination identifier, a component carrier identifier, or, a carrier identifier; and/or, the spatial domain position corresponds to any of the following: a beam identifier, a carrier identifier, a transmission point identifier, or, a quasi-co-location (QCL) identifier.

* * * * *